United States Patent [19]
Takahashi et al.

[11] Patent Number: 5,595,284
[45] Date of Patent: Jan. 21, 1997

[54] CONVEYOR BELT

[75] Inventors: Shuji Takahashi; Kazuhito Yanadori; Yoshiyuki Yamamoto, all of Hiratsuka; Yoichi Shyuto; Takayuki Eifuku, both of Gamagori, all of Japan

[73] Assignees: The Yokohama Rubber Co. Ltd.; Tokyo Rope Mfg. Co., Ltd., both of Tokyo, Japan

[21] Appl. No.: 609,105

[22] Filed: Feb. 29, 1996

[30] Foreign Application Priority Data

May 26, 1995 [JP] Japan ................................ 7-128434
May 26, 1995 [JP] Japan ................................ 7-128436

[51] Int. Cl.$^6$ ................................................ B65G 15/34
[52] U.S. Cl. ..................... 198/847; 428/294; 428/295; 428/297; 428/283
[58] Field of Search ............................. 428/294, 295, 428/283, 297; 148/847

[56] References Cited

U.S. PATENT DOCUMENTS 5,268,221  12/1993  Nakanishi et al. ..................... 428/294
5,346,731   9/1994  Nakanishi ............................. 428/295

Primary Examiner—James J. Bell
Attorney, Agent, or Firm—Nikaido, Marmelstein, Murray & Oram LLP

[57] ABSTRACT

A conveyor belt comprising an endless belt body and a plurality of reinforcing cords embedded in the endless belt body, the reinforcing cord having a triple twist structure using first twisting, secondary twisting, and final twisting, (1) the filaments in the organic fiber filament bundle being oriented at an angle within ±10° to the cord axis of the reinforcing cord or (2) a core yarn being inserted into the core of the twist structure of the reinforcing cord.

9 Claims, 4 Drawing Sheets

CONVEYOR BELT

BACKGROUND OF THE INVENTION

The present invention relates to a conveyor belt and more particularly to a conveyor belt having a light weight, a high tensile force, and an excellent durability.

In general, a conveyor belt comprises an endless belt body of a rubber, a thermoplastic resin, a thermosetting resin or the like and a reinforcing layer embedded in the belt body along the longitudinal direction of the belt body.

A canvas conveyor belt wherein the reinforcing layer is formed of a woven fabric of an organic fiber exemplified by a nylon fiber or a polyester fiber and a steel cord conveyor belt wherein the reinforcing layer is formed of a steel cord are known in the art. In general, the canvas conveyor belt generally has an advantage that it is lighter than the steel cord conveyor belt. Since, however, the tenacity of the canvas conveyor belt is lower than that of the steel cord conveyor belt, the canvas conveyor belt is unsuitable as a conveyor belt which is required to have a high tenacity of not less than 500 kgf/cm.

On the other hand, the steel cord conveyor belt is constructed so that a plurality of steel wires are twisted into a steel cord having a large diameter of about 2 to 15 mm and high tenacity and a plurality of the steel cords are embedded substantially parallel to each other or one another in a belt body along the longitudinal direction of the belt body without using any weft unlike a woven fabric. The use of the steel cord having high tenacity enables finger splicing at an endless joint with a high joint efficiency (joint strength), advantageously offering a conveyor belt which can withstand high tension.

Since, however, in the steel cord conveyor belt, the reinforcing layer is formed of a steel cord, a problem of large weight occurs. In addition, the use of the steel cord poses a problem that the conveyor is rusted, for example, by penetration of water during use in humid environment or due to cracking of the rubber, which is likely to cause adhesion failure or breaking of the cord. Further, the disposal of used conveyor belts is very troublesome.

Worsening of environmental problems and economic environment in recent years have given rise to a strong demand for a conveyor belt having smaller weight, higher tenacity, and longer service life.

In order to solve the above problems involved in the steel cord conveyor belt and the above demand to the conveyor belt, a conveyor belt has been developed wherein an aramid fiber (an aromatic polyamide fiber) having high tenacity among the organic fibers is used in a woven fabric form as the reinforcing layer.

In the conveyor belt using a woven fabric of an aramid fiber in the reinforcing layer, even when a finger splice structure offering the highest endless efficiency is applied to the endless joint, there is a limitation on the joint strength due to the nature of the woven fabric structure of the reinforcing layer, limiting the tenacity to up to about 2000 kgf/cm from the practical viewpoint.

Even though a method for forming an endless structure with a very high endless efficiency could be developed, the woven fabric structure of the aramid fiber cannot satisfactorily utilize high strength inherent in the aramid fiber, and it is substantially impossible to prepare a woven fabric having a tenacity exceeding 2000 kgf/cm and high durability. Further, the woven fabric structure has a drawback that the creation of a notch, such as cracking, at both ends in the widthwise direction of the conveyor belt is likely to cause stress concentration, resulting in breaking of the woven fabric at the crack.

For this reason, the development of a novel conveyor belt, which is light weight and usable in applications where a tenacity exceeding 2000 kgf/cm is required, has been desired in the art.

SUMMARY OF THE INVENTION

An object of the present invention is to provide a conveyor belt which is lightweight, highly tensile, free from the problems of rusting and troublesome disposal, and has excellent durability.

Another object of the present invention is to provide a conveyor belt having enhanced fatigue strength, contributing to longer service life.

The conveyor belt of the present invention comprises an endless belt body and a plurality of reinforcing cords embedded in the endless belt body along the longitudinal direction of the belt body and in substantially parallel alignment at predetermined intervals in the widthwise direction of the belt body without using any weft, the reinforcing cords each having a tenacity of not less than 10 g/d and a diameter of 2 to 15 mm and comprising twisted bundles of organic fiber filaments having a tenacity of not less than 15 g/d, the reinforcing cord has a triple twist structure using first twisting, secondary twisting, and final twisting, respectively effected by twisting a plurality of organic fiber filament bundles into a first twist yarn, twisting a plurality of the first twist yarns into a strand, and twisting a plurality of the strands, (1) the filaments in the organic fiber filament bundle being oriented at an angle within ±10° to the cord axis of the reinforcing cord or (2) a core yarn, having a denier 1 to 15% of the total denier of the reinforcing cords, being inserted into the core of the twist structure of the cord, the core yarn comprising a bundled organic fiber filament yarn having a larger elongation than the organic fiber filament bundle constituting the reinforcing cord.

The use of a reinforcing cord, having a triple twist structure and possessing particular diameter and tenacity, as a reinforcing cord embedded in the belt body can enhance the tensile force (tenacity) and improve the durability of the conveyor belt. Further, the reinforcing cord comprises an organic fiber filament and, hence, is free from rusting and poses no troublesome disposal problem with used conveyor belts.

In the above reinforcing cord having a triple twist structure, the application of tension causes a strand in the core of the twist structure to become angular at a point, in the section of the cord, where strands are mutually in contact with one another, causing the fiber filaments to be acutely bent at the twist center, and repeated application of tension creates buckling and flattening of fiber filaments at the acutely bent portion, resulting in cracking. For this reason, according to the present invention, the filaments in the organic fiber filament bundle are oriented at an angle of ±10° to the cord axis of the reinforcing cord from the viewpoint of avoiding this problem. This can successfully eliminate the bending of the fiber filaments in the core of the twist structure of the cord. According to a preferred embodiment of the present invention, a core yarn having a denier 1 to 15% of the total denier of the reinforcing cords, the core yarn comprising a bundled organic fiber filament yarn having a larger elongation than that constituting the reinforcing cord, is Inserted into the core of the twist structure of the cord. The core yarn functions as a cushioning material, enabling a reduction in the deformation of the contact area where strands are mutually in angular contact with each other or one another. This prevents the creation of a crack of the filaments in the core of the twist structure of the cord and, hence, can improve the fatigue strength, resulting in longer service life of the conveyor belt.

Figure 1:
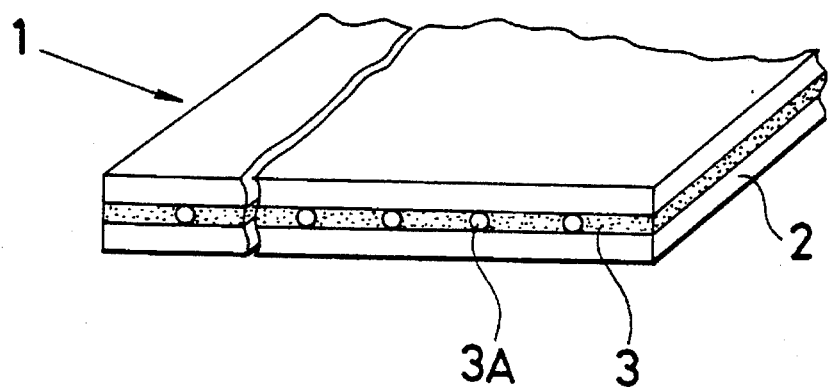
FIG. 1 is a partially cutaway sectional perspective view of a principal part of the conveyor belt according to the present invention.

DESCRIPTION OF THE PREFERRED EMBODIMENT (1) In FIG. 1, conveyor belt 1 comprises endless belt body 2 formed of a rubber, a thermoplastic resin, a thermosetting resin or the like and reinforcing layer 3 embedded, in the belt body, along the longitudinal direction of the belt body.

Reinforcing layer 3 has a plurality of reinforcing cords 3A provided along the longitudinal direction of belt body 2, and these reinforcing cords 3A are provided substantially parallel to each other or one another at predetermined intervals in the widthwise direction of belt body 2.

Figure 2:
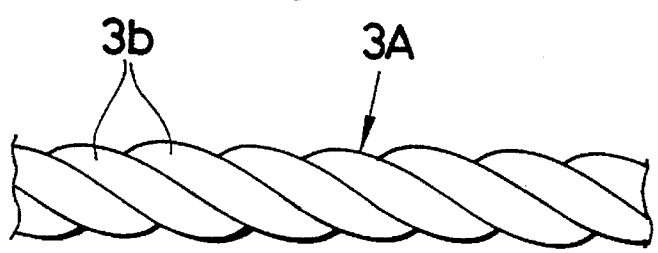
FIGS. 2 (a) to 2 (e') are enlarged explanatory views showing reinforcing cords, wherein FIGS. 2 (a), 2 (c), 2 (d), and 2 (e) are side views of the principal part, and FIGS. 2 (b), 2 (c'), 2 (d'), and 2 (e') are sectional views.
Figure 2:
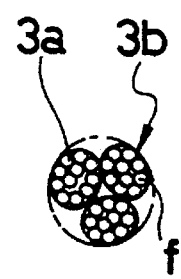
Figure 2:
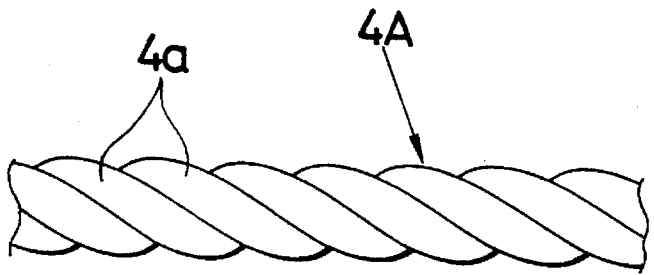
Figure 2:
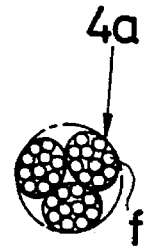
Figure 2:
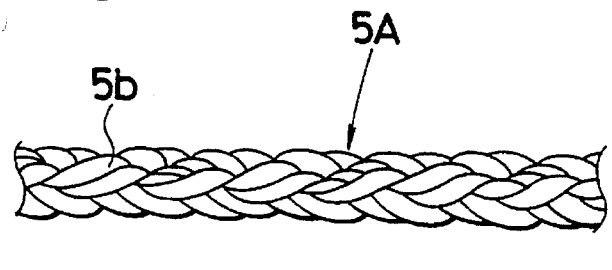
Figure 2:
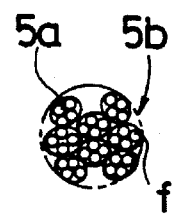
Figure 2:
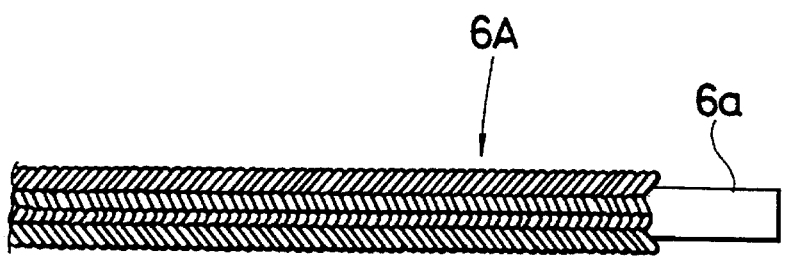
Figure 2:
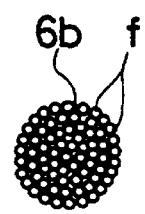

As shown in FIGS. 2 (a) and 2 (b), reinforcing cord 3A constituting reinforcing layer 3 is constructed by twisting a plurality of organic fiber filament bundles f having a tenacity of not less than 15 g/d (the organic fiber filament bundle being a group of a number of substantially untwisted very thin filaments, each having a thickness of several m to several tens of m, gathered together and generally called "a raw yarn") into first twist yarn 3a, twisting a plurality of first twist yarns 3a into strand 3b, and twisting a plurality of strands 3b. That is, reinforcing cord 3A has a triple twist structure formed by first twisting wherein organic filament bundles f are twisted, secondary twisting wherein first twist yarns 3a are twisted, and final twisting wherein strands 3b are twisted. Reinforcing cord 3A has a tenacity of not less than 10 g/d and a diameter of 2 to 15 mm.

Figure 3:
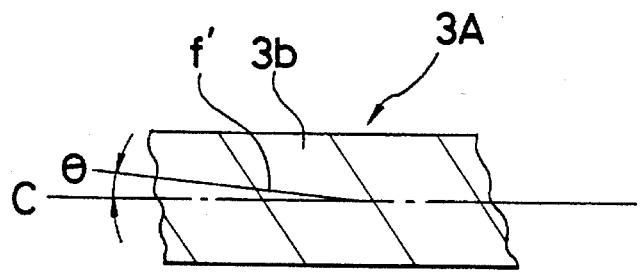
FIG. 3 is an explanatory view showing the orientation of a fiber filament in a reinforcing cord.

As shown in FIG. 3, filaments f' in organic fiber filament bundle f are twisted so that they are oriented at an angle θ within ±10° to cord axis c of the reinforcing cord 3A.

The reason why the organic fiber filaments are used in a cord form is to enhance the strength of the endless joint through the application of finger splicing, enabling the production of a belt conveyor having high tenacity, as well as to avoid problems associated with the use of a woven fabric, that is, a problem of increased thickness of the conveyor belt and a problem of a lowering in strength due to the creation of a notch.

Methods, for twisting organic fiber filaments into a cord, other than the triple twisting, include a double twisting method, as shown in FIGS. 2 (c) and 2 (c'), which comprises first twisting and final twisting, that is, comprises subjecting a plurality of organic fiber filament bundles f gathered together to first twisting to form strand 4a and subjecting a plurality of strands 4a gathered together to final twisting to form reinforcing cord 4A; a method, as shown in FIGS. 2 (d) and 2 (d'), which comprises subjecting a plurality of organic fiber filament bundles f gathered together to first twisting to form first twist yarn 5a, subjecting a plurality of first twist yarns 5a gathered together to final twisting to form strand 5b, and braiding a plurality of strands 5b into a braid, thereby forming braid reinforcing cord 5A (which is called "a six strand cord" when the number of strands 5b is six and "an eight strand cord" when the number of strands 5b is eight); and a method, as shown in FIGS. 2 (e) and 2 (e'), which comprises twisting a plurality of organic fiber filament bundles f gathered together into form core yarn 6a, gathering a plurality of fiber filament bundles f on the outside of the core yarn 6a, twisting them into first twist yarn 6b, and braiding a plurality of first twist yarns 6b into a braid, thereby forming core braid reinforcing cord 6A. In all the above methods, however, the utilization of the strength inherent in the organic fiber filament is unsatisfactory, posing a problem that, in order to provide a high tensile cord, the amount of the fiber used should be increased resulting in increased cord denier and fatigue resisting strength is poor.

When the reinforcing cord 3A extending in the longitudinal direction of the reinforcing layer 3 embedded in the belt body 2 has a triple twist structure formed by first twisting, secondary twisting, and final twisting and, at the same time, the diameter and the tenacity of the reinforcing cord fall within the above defined respective ranges, the reinforcing cord can be lightweight and highly tensile and, at the same time, the durability of the conveyor belt can be improved. Further, in this case, rusting such as observed in the use of a steel cord does not occur, and the disposal of used conveyor belts is easy.

Figure 4:
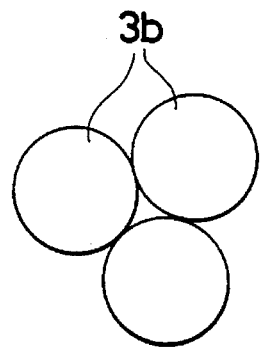
FIGS. 4 (a) and 4 (b) are explanatory views of a reinforcing cord before and after the application of tension, wherein FIG. 4 (a) is a sectional view of the reinforcing cord before the application of tension and FIG. 4 (b) is a sectional view of the reinforcing cord after the application of tension.
Figure 4:
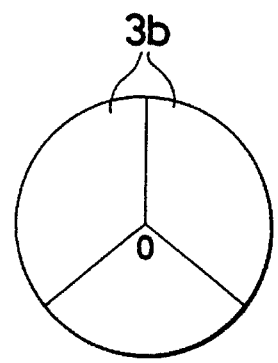

However, even when the reinforcing cord 3A satisfies the above requirements for diameter and tenacity with the triple twist structure being merely adopted, the application of tension causes the point of mutual contact between strands 3b in the cord twist center O to undergo angular deformation, that is, to be deformed from the state as shown in FIG. 4 (a) to the state as shown in FIG. 4 (b). As a result, organic fiber filament bundles f, constituting each strand, passing through the center O are acutely bent at the position of the center O, and repeated application of tension creates buckling and flattening of filaments f' in organic filament bundle f'at the twist center O, resulting in cracking of filaments f' with this position as the starting point of cracking. Further, fibrillation of filaments f' is accelerated resulting in lowered strength. The present inventors have found the above fact by electronmicroscopy after a running test of a conveyor belt. They have made extensive and intensive studies with a view to eliminating the above problem and, as a result, have found that the above problem can be solved by orienting filaments f' in organic fiber filament bundle f in the above contact portion within the strand 3*b* at a predetermined angle to cord axis c.

More specifically, filaments f' in organic fiber filament bundle f are oriented in the same direction as cord axis c of reinforcing cord 3A or at an angle of not more than 10° to cord axis c of reinforcing cord 3A, that is, oriented at an angle within ±10° to cord axis c. In this case, filaments f' in organic fiber filament bundle are oriented substantially parallel to cord axis c at cord twist center O. This prevents filaments f' from being acutely bent and, upon repeated application of tension to the conveyor belt, can prevent buckling and flattening of filaments f', so that filaments f' are less likely to crack. Further, in this case, the filaments constituting respective strands 3*b* are mutually in line contact which provides a longer contact length, reducing the contact force. Therefore, in addition to the prevention of cracking, fibrillation is suppressed, resulting in improved fatigue strength of reinforcing cord 3A and longer service life of the conveyor belt.

For the above reason, in the present invention, filaments f' in organic fiber filament bundle are oriented at an angle within ±10° to cord axis c of reinforcing cord 3A. When the angle is outside the above range, filaments f' in organic fiber filament bundle f of strand 3*b* are likely to be bent at an acute angle in cord twist center O, causing the occurrence of cracking and fibrillation. This results in deteriorated fatigue resistance. The orientation angle θ of filaments f' in organic fiber filament bundle f can be regulated as desired by regulating the number of first twists or the number of secondary twist depending upon the thickness of reinforcing cord 3A and the number of final twists. The twist sense is not particularly limited, and what is important here is that the orientation angle θ of filaments f' in organic fiber filament bundle f is within ±10° to cord axis c of reinforcing cord 3A.

Figure 5:
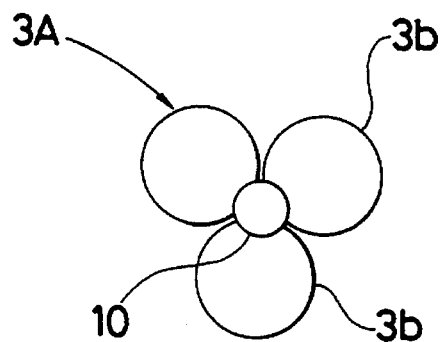
FIG. 5 is an explanatory sectional view showing an embodiment wherein a core yarn is provided in the core of the twist structure of the reinforcing cord.

In the present invention, as described above, in addition to the orientation of filaments f' at an angle θ within ±10° to cord axis of reinforcing cord 3A, as shown in FIG. 5, it is possible to continuously insert core yarn 10 as a cushioning material into the core of a twist structure formed of strands 3*b* (core of reinforcing cord 3A) along the longitudinal direction of strands 3*b*.

Core yarn 10 has a denier 1 to 15% of the total denier of the reinforcing cord 3A (excluding core yarn 10) and comprises a bundled organic fiber filament yarn f having a larger elongation than that constituting strand 3*b*. By virtue of the insertion of core yarn 10 in the core of the twist structure formed of strands 3*b*, core yarn 10, upon application of tension, functions as a cushioning material and thereby can reduce the deformation of the contact portion in cord twist center O where strands 3*b* are in angular contact with one another. This can reduce buckling and flattening of filaments f' at the contact portion, enabling the service life of the belt conveyor to be further prolonged.

Figure 6:
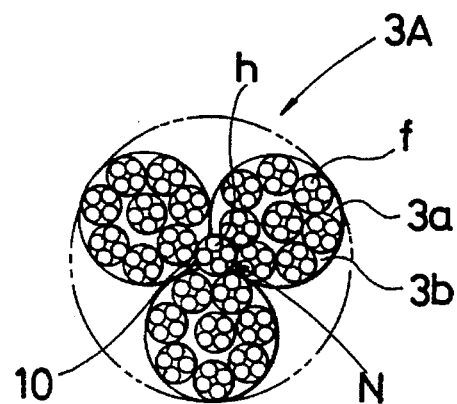
FIG. 6 is an explanatory sectional view showing another embodiment wherein a core yarn is provided in the core of the twist structure of the reinforcing cord.

(2) Further, in the present invention, without setting an angle θ of the above orientation of filaments f' to within ±10° to cord axis c of reinforcing cord 3A, as shown in FIG. 6, core yarn 10 may be continuously inserted as a cushioning material into core N in a twist structure of reinforcing cord along the longitudinal direction of reinforcing cord 3A. Core yarn 10 comprises a bundled organic fiber filament yarn h having a larger elongation than organic fiber filament bundle f constituting reinforcing cord 3A and the total denier thereof is 1 to 15% of the total denier of reinforcing cord 3A (excluding core yarn 10).

Figure 7:
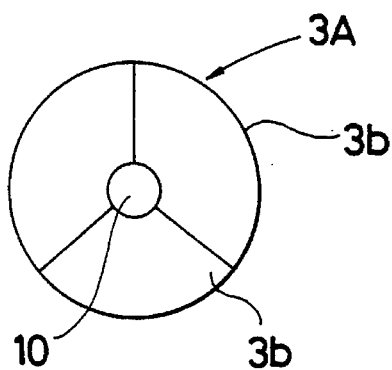
FIG. 7 is an explanatory sectional view showing the state of a reinforcing cord, having a core yarn in the core thereof, upon application of tension.

The insertion of core yarn 10 comprising a bundled organic fiber filament yarn h having a larger elongation than organic fiber filament bundle f constituting reinforcing cord 3A, with the yarn denier being specified as described above, into the core of the twist structure formed of strands 3*b* can maintain the evenness as reinforcing cord 3A and, at the same time, when twisted strands 3*b* are deformed upon application of tension to reinforcing cord 3A, as shown in FIG. 7, enables core yarn 10 to function as a cushioning material between organic fiber filament bundles f which, when the cushioning material is absent, have been in contact with one another at cord twist center O. This can reduce the deformation of the contact portion in cord twist center O where strands 3*b* are in angular contact with one another. This in turn can reduce buckling and flattening of filaments f' in organic fiber filaments f' such as created in twist center O, preventing the occurrence of cracking in filaments f'. Therefore, the prevention of cracking is combined with the suppression of fibrillation of filaments f' to improve the fatigue resisting strength of reinforcing cord 3A, resulting in longer service life of the conveyor belt.

Figure 8:
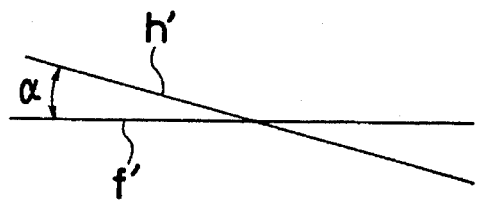
FIG. 8 is an explanatory view showing the orientation angle of a filament constituting the core yarn.

Preferably, a plurality of organic fiber filament bundles h are gathered together to constitute core yarn 10 (which is the same as core yarn 10 described above in (1)). Preferably, as shown in FIG. 8, filaments h' are oriented at an angle within ±20° to the orientation direction of filaments f' in organic fiber filament bundle f constituting strands 3*b*. When the orientation angle α of filaments h' is outside the above range ±20°, the application of tension, which causes filaments f', h' in organic fiber filaments bundles f, h to mutually come into strong contact, results in point contact, causing local stress concentration. Therefore, the contact portion is likely to be damaged, leading to deteriorated fatigue resistance. The orientation angle α is still preferably within ±10°.

(3) When the denier of core yarn 10 is less than 1% of the total denier of reinforcing cord 3A (excluding the denier of core yarn 10), the function of core yarn 10 as a cushioning material is unsatisfactory. On the other hand, if it exceeds 15%, the diameter of reinforcing cord 3A becomes so large that the thickness of conveyor belt 1 is increased and, at the same time, core yarn 10 is likely to be projected from between strands 3*b* toward the outside of the cord. This deteriorates the evenness of reinforcing cord 3A, resulting in lowered strength. The denier of core yarn 10 is still preferably not more than 10%.

From the viewpoint of fabrication, core yarn 10 is preferably one formed by twisting a plurality of organic fiber filament bundles gathered together. The organic fiber is not particularly limited and may be any known organic fiber so far as it has a larger elongation than organic fiber filament bundle f constituting strand 3*b*. Preferably, the organic fiber comprises a nylon fiber and/or a polyester fiber.

Core yarn 10 extends substantially straight in the core of reinforcing cord 3A toward the longitudinal direction of reinforcing cord 3A. Therefore, the use of a fiber material having a smaller elongation than organic fiber filament bundle f constituting strand 3*b* causes the fiber material to be broken prior to breaking of the reinforcing cord, resulting in deteriorated function of the core yarn as the cushioning material.

Further, reinforcing cord 3A should have a tenacity of not less than 10 g/d. When it is less than 10 g/d, it is virtually impossible to provide a high tensile conveyor belt. Specifically, when the tenacity is excessively low, the end count of the cord should be very large in order to provide a high tensile conveyor belt, resulting in lowered productivity of the belt and remarkably deteriorated working efficiency for forming an endless joint.

In addition, finger splicing becomes virtually impossible. Furthermore, when the end count of the cord is large, the advantage of the lightweight property cannot be enjoyed, making it virtually impossible to provide a lightweight and high tensile conveyor belt. For this reason, organic fiber filament bundle f used in the cord should have a tenacity of not less than 15 g/d. Therefore, filaments f' in organic fiber filament bundle f too should have a tenacity of not less than 15 g/d.

Twisting of organic fiber filament bundles f is generally known to make the strength of the filament bundles lower than the strength of untwisted organic fiber filament bundles. For this reason, even though a cord has a triple twist structure as in the present invention, it is virtually impossible to bring the tenacity of reinforcing cord 3A to not less than 10 g/d when organic fiber filament bundles f with a tenacity of less than 15 g/d are used.

Organic fibers having a tenacity of not less than 15 g/d include aramid fibers, vinylon fibers, poly-p-phenylenebenzbisoxazole fibers, poly-p-phenylenebenzbisthiazole fibers, polyarylate fibers, and super high-molecular weight polyethylene fibers.

When a further enhancement in tenacity of reinforcing cord 3A is contemplated, the tenacity of organic fiber filament bundle f (filament f') is still preferably not less than 20 g/d.

When the diameter of reinforcing cord 3A is less than 2 mm, the tenacity per cord is less than 1000 kgf even though the tenacity is not less than 10 g/d, making it impossible to provide satisfactory tenacity. Therefore, a large number of cords should be embedded in the rubber in order to provide a conveyor belt having a tenacity of not less than 2000 kgf/cm. This renders the formation of an endless joint very troublesome, remarkably deteriorating the productivity of the conveyor belt. For this reason, the diameter of the reinforcing cord should be not less than 2 mm. On the other hand, when the diameter exceeds 15 mm, high tenacity can be provided. In this case, however, it becomes virtually impossible to satisfactorily ensure an endless joint strength which matches the high tenacity, resulting in lowered durability of the belt. Further, the increased cord diameter increases the thickness of the conveyor belt and, consequently, reduces the advantage of the lightweight property. Further, a cord diameter exceeding 15 mm increases the deformation of the cord on a guide pulley for driving a conveyor belt during running of the conveyor belt, resulting in deteriorated fatigue strength.

The final twist multiplier K of reinforcing cord 3A is preferably in the range of from 500 to 1500. The final twist multiplier K is defined as $T \cdot D^{1/2}$ wherein T represents the number of final twists, twists/10 cm, and D represents the total denier (d) of reinforcing cord 3A. When the final twist multiplier K is less than 500, the tenacity of reinforcing cord 3A is improved. In this case, however, the fatigue resistance is lowered, deteriorating the durability of the conveyor belt. When the final twist multiplier K exceeds 1500, both the tenacity and fatigue resisting strength of reinforcing cord 3A are likely to lower.

The number of doublings for first twist yarn is preferably smaller than the number of doublings for strand 3b (i.e., the total number of first twist yarns 3a used for forming a single strand 3b). This further enhances the tenacity of reinforcing cord 3A, resulting in further improved durability of conveyor belt 1. The expression "the number of doublings for first twist yarn 3a" used herein refers to the number of raw yarns (organic fiber filament bundles f) used for forming a single first twist yarn 3a. In general, the fiber is produced as an organic filament bundle f composed of a bundle of a large number of filaments. For example, an aramid fiber is supplied as 1500-d organic fiber filament bundle f composed of a bundle of 1000 filaments. When a plurality of organic filament bundles f are bundled, the number of organic filament bundles f used for this purpose is the number of doublings for first twist yarn 3a.

As described above, a plurality of organic fiber filament bundles f (filaments f', are very thin monofilaments in organic fiber filament bundle f) are gathered together and twisted into first twist yarn 3a, a plurality of first twist yarns 3a are gathered together and subjected to secondary twisting into strand 3b, and a plurality of strands 3b are gathered together and subjected to final twisting into reinforcing cord 3A. For the twist direction in the twisting steps, the following four combinations of twist direction are preferably combined. Specifically, combinations of twist direction respectively for first twisting, secondary twisting, and final twisting may be: S/S/Z, S/Z/S, Z/Z/S, and Z/S/Z. That at least the secondary twisting and the final twisting are different from each other in twist direction is preferred from the viewpoint of shape retention of reinforcing cord 3A.

Further, the twist direction of reinforcing cord 3A embedded in belt body 2 is preferably opposite to that of adjacent reinforcing cord 3A. Since this can balance the release torque of the twist, snaking and curling (torsion) of conveyor belt 1 can be prevented, improving linear advance of conveyor belt 1.

Reinforcing cord 3A is preferably embedded so as to be more densely in both side portions of belt body 2 than in the center portions. This increases tear resistance of both the side portions of conveyor belt 1 and the resistance to external damage by biting or the like.

The number o strands 3b twisted is preferably three. When it is four or more, the space in the twice center becomes large, necessitating the use of a yarn having a larger denier as core yarn 10. This thickens reinforcing cord 3A or lowers the strength per unit weight of reinforcing cord 3A. In addition, the twisting work becomes complicated resulting in lowered twisting efficiency. Further, when the number of strands twisted is four or more, in addition to the lowered twisting efficiency, the angle of strand 3b at the contact area in cord twist center 0, when tension is applied to the cord, becomes so acute that filaments f' are likely to be bent, resulting in lowered fatigue resistance. On the other hand, when the number of strands twisted is two, the shape retention of the cord is deteriorated, deteriorating the handleability. Further, in this case, the application of tension is likely to flatten reinforcing cord 3A and, hence, increases the area of contact between strands 3b, resulting in deteriorated fatigue resistance. When the number of strands twisted is one, the twisting is substantially single. In this case, no shape retention is ensured, and the tenacity and fatigue resistance of the cord are remarkably poor.

In order to further improve the effect of the present invention, at least one of organic fiber filament bundle f for constituting the reinforcing cord, first twist yarn 3a formed by twisting a large number of organic fiber filament bundles f, and strand 3b formed by twisting a plurality of first twist yarns 3a is preferably coated with an adhesive layer containing a rubber latex prior to twisting into reinforcing cord 3A.

More specifically, it is preferred that, before organic fiber filament bundles f for forming reinforcing cord 3A are twisted into first twist yarn 3a, they be treated with a film-forming adhesive containing a rubber latex to coat the surface of organic fiber filament bundle f with the adhesive, that, before first twist yarns 3a formed by twisting a plurality of organic fiber filament bundles f are twisted into strand 3b, they be treated with a film-forming adhesive containing a rubber latex to coat the surface of first twist yarns 3a with the adhesive, or that, before strands 3b formed by twisting a plurality of first twist yarns 3a are twisted into reinforcing cord 3A, they be treated with a film-forming adhesive containing a rubber latex to coat the surface of strands 3b with the adhesive.

Thus, even though fiber filaments f are cracked at the contact portion in the center O of reinforcing cord 3A where strands 3b are in contact with each other, the formation of a surface protective coating using an adhesive containing a rubber latex before twisting into reinforcing cord 3A enables fibrillation of fiber filaments f by friction between strands 3b to be suppressed by the protective coating, contributing further prolongation of the service life of the conveyor belt.

The rubber latex is not particularly limited, and examples thereof include vinylpyridine/styrene/butadiene terpolymer rubber latex, styrene/butadiene copolymer rubber latex, natural rubber latex, butadiene rubber latex, chloroprene rubber latex, and acrylonitrile/butadiene copolymer rubber latex.

In addition to the rubber latex, an adhesive, such as an initial condensation product of resorcin with formaldehyde may be incorporated.

Preferably, the formation of a protective coating using an adhesive containing a rubber latex prior to twisting into a reinforcing cord is carried out when the organic fiber filaments are still in a strand form. This treatment may be carried out when the organic fiber filaments are in an organic fiber filament bundle form or in a first twist yarn form. In this case, however, the number of pieces to be treated is increased to unfavorably render the treatment work troublesome, lowering the treatment efficiency. For example, after the first twist yarns is coated with the adhesive, the adhesive may be again applied to strands. However, single coating treating when the fiber filaments are in a strand form is preferred from the viewpoint of efficiency. In any event, treatment prior to twisting into a reinforcing cord is preferred when the durability of the conveyor belt is taken into consideration.

Further, fine particles of graphite, fine particles of molybdenum disulfide, or a mixture of fine particles of graphite with fine particles of molybdenum disulfide may be incorporated into the adhesive. As described above, reinforcing cord 3A is formed by twisting a plurality of strands 3b. Therefore, upon application of tension, reinforcing cord 3A is bent by a guide roll or the like, causing minute friction among strands 3b. This results in the displacement of the strands. In this case, fiber filaments f are fibrillated due to the friction, resulting in lowered strength. The incorporation of fine particles of graphite, fine particles of molybdenum disulfide, or a mixture of fine particles of graphite with fine particles of molybdenum disulfide into the adhesive reduces the frictional resistance, enabling the fibrillation of fiber filaments f to be more efficiently prevented.

The diameter of these fine particles is preferably not more than 10 μm. It is still preferably not more than 1 μm from the viewpoint of lubricity and adhesion. The amount of the fine particles added to the adhesive is preferably not more than 80 parts by weight based on 100 parts by weight of the adhesive. When it exceeds 80 parts by weight, the adhesion between the adhesive and fiber filaments f is likely to lower. The addition of the fine particles in an amount of 10 to 40 parts by weight based on 100 parts by weight of the adhesive is still preferred from the viewpoint of the frictional resistance and the adhesion.

EXAMPLES (1) A 1500-d raw yarn (composed of 1000 filaments) of an aramid fiber (Technora, manufactured by Teijin Ltd.) having a tenacity of 28 g/d was used as an organic fiber filament bundle to form reinforcing cords having constructions specified in Table 1. The reinforcing cords were embedded parallel to one another in a rubber to prepare conveyor belts. The conveyor belts had a perimeter of 8 m, a width of 50 cm, and a thickness of 16 mm. The conveyor belt of the present invention (Example 1) and comparative conveyor belts (Comparative Examples 1 to 3) were prepared under identical conditions except for the reinforcing cord.

In the reinforcing cords of the present invention, the orientation angle of filaments to the cord axis was 0°, the number of strands is three, and the final twist multiplier K was 1100.

Prior to embedding in the rubber, these reinforcing cords were immersed in an aqueous solution of a water-soluble epoxy resin, dried, heat-treated, further immersed in a mixed solution of an initial condensation product, between resorcin and formaldehyde, and a rubber latex, dried, and heat-treated to improve the adhesion between the reinforcing cords and the rubber.

The conveyor belts were evaluated for durability under the following conditions. The results are given in Table 1.
Tenacity
A tensile specimen was cut out from each new conveyor belt at a position at least 50 mm away from both ends of the belt according to JIS K6369 (steel cord conveyor belt).
Durability
Each conveyor belt was mounted between pulleys 20, 21 having a diameter of 600 mm in a belt running tester as schematically shown FIG. 9. A tension of 300 kgf per cm of belt width was applied, and the belt was run 5,000,000 turns at a speed of 150 m/min. After running, a tensile specimen was extracted in the same manner as described above, and the tenacity thereof was measured. The retention (%) of the tenacity after running relative to the tenacity before running was determined as a measure of the durability of the conveyor belt. The higher tenacity retention, the better the durability of the belt.

TABLE 1

|  | Example 1 | Comparative Example 1 | Comparative Example 2 | Comparative Example 3 |
| --- | --- | --- | --- | --- |
| Cord twisting method | Triple twisting | Double twisting | Eight strand structure | Braid structure (core braid) |
| Total denier of cord | 225000 | 225000 | 216000 | 232500 |

TABLE 1-continued

| Cord structure | 1500d/5/10/3 | 1500d/50/3 | 1500d/3/6/8 | Core: 1500d/5/15 Skin: 1500d/5 × 16 |
|---|---|---|---|---|
| Cord diameter (mm) | 6.2 | 6.1 | 6.3 | 6.3 |
| Tenacity before running (kgf) | 4050 | 3300 | 3100 | 2900 |
| Tenacity (g/d) | 18.0 | 14.7 | 14.4 | 12.5 |
| Strength retention (%) | 91 | 74 | 76 | 68 |

Note)
Triple twisting: Five raw yarns of 1500-d aramid (1000 filaments) were doubled and twisted into a first twist yarn. Ten 1500d/5 first twist yarns (3a) were gathered together and twisted into a secondary twist yarn. Three 1500d/5/10 secondary twist yarns (strands 3b) were gathered together and subjected to final twisting, thereby preparing reinforcing cord 3A shown in FIG. 2 (a).
Double twisting: Fifty raw yarns of 1500-d aramid (1000 filaments) were doubled and twisted into a first twist yarn. Three 1500d/50 first twist yarns were gathered together and subjected to final twisting, thereby preparing reinforcing cord 4A shown in FIG. 2 (c).
Eight strand structure: Three raw yarns of 1500-d aramid (1000 filaments) were doubled and twisted into a first twist yarn. Six 1500d/3 first twist yarns were gathered together and subjected to final twisting to form a strand. Eight 1500d/3/6 strands were used to form an eight strand structure.
Braid structure (core braid): Five raw yarns of 1500-d aramid (1000 filaments) were doubled and twisted into a first twist yarn. Fifteen 1500d/5 first twist yarns were gathered together and subjected to final twisting to prepare a core. Sixteen twist yarns formed by doubling and twisting 5 raw yarns of 1500-d aramid (1000 filaments) were braided on the outside of the core or skin (or sheath).

Further, conveyor belts of the present invention (Examples 2 to 4) and comparative conveyor belts (Comparative Examples 4 and 5) were prepared in the same manner as described above in connection with the preparation of the conveyor belt of the present invention (Example 1), with the organic fiber and the size of the conveyor belt kept the same as those in Example 1, except that, the number of secondary twists of the strand was regulated and the orientation angle (°) of the filaments to the cord axis was varied as specified in Table 2.

These conveyor belts were tested for durability in the same manner as described above, and the strength retention was determined.

TABLE 2

| | Comp. Ex. 4 | Ex. 2 | Ex. 3 | Ex. 4 | Comp. Ex. 5 |
|---|---|---|---|---|---|
| Orientation angle of filaments (*) | −20 | −10 | 0 | 10 | 20 |
| Strength retention (%) | 77 | 87 | 91 | 86 | 78 |

"−" represents the direction opposite to the orientation direction of the strand.

Further, the conveyor belts of the present invention (Examples 5 to 8) were prepared in the same manner as described above in connection with the preparation of the conveyor belt of the present invention, with the organic fiber and the size of the conveyor belt kept the same as those in the conveyor belt of the present invention, except that, the final twist multiplier K was varied and the orientation angle (°) of the filaments to the cord axis was set to ° by regulating the number of secondary twists. The retention (%) of the tenacity before the belt durability test relative to the tenacity after the belt durability test was determined as described above. The results are give in Table 3.

TABLE 3

| | Ex. 5 | Ex. 6 | Ex. 7 | Ex. 8 |
|---|---|---|---|---|
| Final twist multiplier K | 400 | 600 | 1400 | 1600 |
| Tensile strength before test (kgf) | 4350 | 4200 | 3950 | 3540 |
| Strength retention (%) | 82 | 84 | 93 | 82 |

Further, conveyor belts of the present invention (Examples 9 to 14) were prepared in the same manner as described above in connection with the preparation of the conveyor belt of the present invention (Example 1) as given in Table 1, with the structure of the reinforcing cord kept the same as in Example 1, except that, a core reinforcing cord was prepared using a 66 nylon fiber as a core yarn in the reinforcing cord. The durability of the conveyor belts thus obtained were measured in the same manner as described above.

The structure of the reinforcing cord excluding the core yarn was 1500d/5/10/3, and a 1890-d raw yarn of a 66 nylon fiber was used as the core yarn. In this case, the number of doublings were varied to vary the total denier of the core yarn. All the core yarns used were in a twisted form. The results of measurements of the durability are given in Table 4.

TABLE 4

| | Example 19 | Example 10 | Example 11 | Example 12 | Example 13 | Example 14 |
|---|---|---|---|---|---|---|
| Total denier of core yarn (d) | no core yarn | 3780 | 9450 | 18900 | 28350 | 37800 |
| Proportion of total denier of core yarn to that of reinforcing cord (%) | 0 | 1.7 | 4.2 | 8.2 | 12.6 | 16.8 |

TABLE 4-continued

|  | Example 19 | Example 10 | Example 11 | Example 12 | Example 13 | Example 14 |
|---|---|---|---|---|---|---|
| Strength retention (%) | 91 | 93 | 94 | 9.5 | 92 | 88 |

TABLE 5

|  | Ex. 15 | Ex. 16 | Ex. 17 |
|---|---|---|---|
| Rubber latex coating | Done | Done | Not done |
| Addition of graphite | Not done | Done | Not done |
| Strength retention (%) | 94 | 98 | 90 |

Further, conveyor belts of the present invention (Examples 15 and 17) were prepared in the same manner as described above in connection with the preparation of the conveyor belt of the present invention (Example 1) as given in Table 1, with the structure of the reinforcing cord kept the same as in Example 1, except that, the strand was treated with an adhesive containing a rubber latex to form a coating of the adhesive on the surface of the strand and the coated strands were then twisted into a reinforcing cord. Separately, a conveyor belt (Example 16) was prepared in the same manner as describe just above, except that the adhesive further contained fine particles of graphite.

Specifically, five 1500-d raw yarns (1000 filaments) of aramid were doubled and twisted into a first twist yarn. Ten 1500d/5 first twist yarns (3a) were gathered together and subjected to secondary twisting into a strand.

This strand was treated with an adhesive solution of a vinylpyridine/styrene/butadiene terpolymer rubber latex (Nipol 2518FS, manufactured by Nippon Zeon Co., Ltd.), an epoxy resin (DENACOL EX313, manufactured by Nagase Chemicals Ltd.) and a blocked isocyanate (ELASTRON BN69, manufactured by Dai-Ichi Kogyo Seiyaku Co., Ltd.) dissolved in a ratio of 3:1:1 on a solid basis in water, dried, and heat-treated. Thereafter, three treated strands were twisted as described above into a twisted reinforcing cord.

Similarly, the above strand was treated with an adhesive dispersion of a vinylpyridine/styrene/ butadiene terpolymer rubber latex (Nipol 2518FS, manufactured by Nippon Zeon Co., Ltd.), an epoxy resin (DENACOL EX313, manufactured by Nagase Chemicals Ltd.), a blocked isocyanate (ELASTRON BN69, manufactured by Dai-Ichi Kogyo Seiyaku Co., Ltd.), and fine particles of graphite having an average particle diameter of 0.1 μm in a ratio of 3:1:1:1 (20 parts of graphite based on 100 parts of the adhesive) on a solid basis in water, dried, and heat-treated. Thereafter, three treated strands were twisted as described above into a twisted reinforcing cord.

Separately, a reinforcing cord was prepared in the same manner as described just above, except that the solution for treating the strand was an aqueous solution of an epoxy resin, not containing a rubber latex, and a blocked isocyanate in a ratio of 1:1 on a solid basis.

These three reinforcing cords were then immersed in a mixed solution of an initial condensation product, between resorcin and formaldehyde, and a rubber latex, dried, and heat-treated to improve the adhesion between the reinforcing cord and the rubber.

These reinforcing cords were embedded in a rubber to prepare conveyor belts, and the durability of the conveyor belts were measured as described above. The results are given in Table 5.

(2) A 1500-d raw yarn (composed of 1000 filaments) of an aramid fiber (Technora, manufactured by Teijin Ltd.) having a tenacity of 28 g/d was used as an organic fiber filament bundle to form reinforcing cords having constructions specified in Table 1. The reinforcing cords were embedded parallel to one another in a rubber to prepare conveyor belts. The conveyor belts had a perimeter of 8 m, a width of 50 cm, and a thickness of 16 mm. The conveyor belt of the present invention (Example 18) and comparative conveyor belts (Comparative Examples 6 to 8) were prepared under identical conditions except for the reinforcing cord.

A core yarn was used in the reinforcing cord for the conveyor belt of the present invention. Four 1500-d raw yarns of a polyester fiber filament bundle was bundled together to form a 1500d/4 bundled yarn which was used as the core yarn.

The total denier of the core yarn was 4.8% of the total denier of the reinforcing cord. Further, the orientation angle of the fiber filaments in the core yarn to the orientation direction of the fiber filament constituting the strand in the reinforcing cord was 0°, and the final twist multiplier K of the reinforcing cord was 1000.

Prior to embedding in the rubber, these reinforcing cords were immersed in an aqueous solution of a water-soluble epoxy resin, dried, heat-treated, immersed in a mixed solution of an initial condensation product, between resorcin and formaldehyde, and a rubber latex, dried, and heat-treated to improve the adhesion between the reinforcing cord and the rubber.

The conveyor belts were evaluated for durability under the following conditions. The results are given in Table 6. Tenacity A tensile specimen was cut out from each new conveyor belt at a position at least 50 mm away from both ends of the belt according to JIS K6369 (steel cord conveyor belt).

Durability

Figure 9:
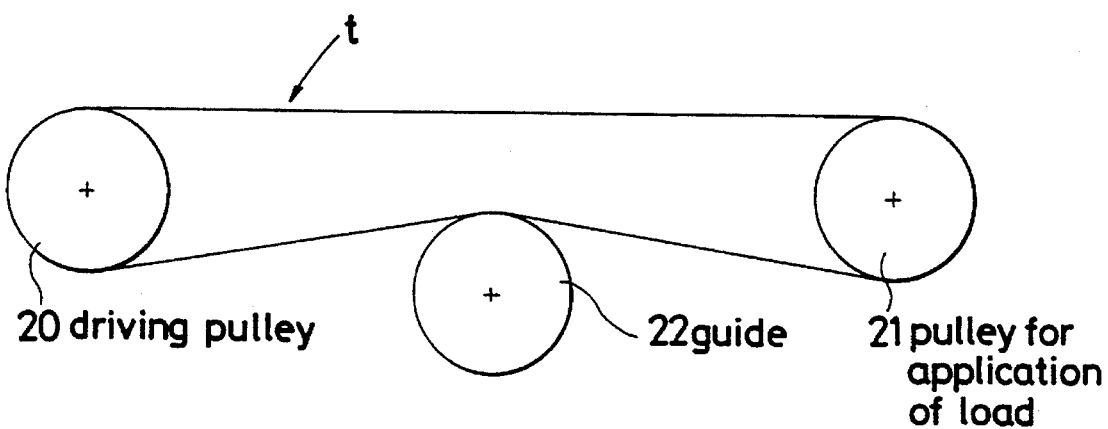
FIG. 9 is a schematic explanatory view showing a running test of a conveyor belt.

Each conveyor belt t was mounted between pulleys 20, 21 having a diameter of 600 mm in a belt running tester as schematically shown FIG. 9. A tension of 250 kgf per cm of belt width was applied, and the belt was run 5,000,000 turns at a speed of 150 m/min. After running, a tensile specimen was extracted in the same manner as described above, and the tenacity thereof was measured. The retention (%) of the tenacity after running relative to the tenacity before running was determined as a measure of the durability of the conveyor belt. The higher tenacity retention, the better the durability of the belt.

TABLE 6

|  | Example 18 | Comparative Example 6 | Comparative Example 7 | Comparative Example 8 |
|---|---|---|---|---|
| Cord twisting method | Triple twisting | Double twisting | Eight strand structure | Braid structure |
| Total denier of reinforcing cord | 180000 | 180000 | 180000 | 180000 |
| Cord structure | 1500d/4/10/3 Core yarn: 1500d/4 | 1500d/40/3 | 1500d/3/5/8 | Core: 1500d/4/14 Skin: 1500d/4 × 16 |
| Cord diameter (mm) | 5.4 | 5.1 | 5.2 | 5.3 |
| Tenacity before test (kgf) | 3250 | 2750 | 2650 | 2450 |
| Tenacity (g/d) | 17.5 | 15.2 | 14.7 | 13.6 |
| Strength retention (%) | 90 | 75 | 78 | 72 |

Note)
Triple twisting: Four raw yarns of 1500-d polyester fiber were doubled and twisted into a core yarn. Separately, four raw yarns of 1500-d aramid (1000 filaments) were doubled and twisted into a first twist yarn. Ten 1500d/4 first twist yarns (3a) were gathered together and twisted into a secondary twist yarn (strand 3b). Three 1500d/4/10 secondary twist yarns (strand 3b) were placed on the core yarn and subjected to final twisting to prepare a reinforcing cord 3A shown in FIG. 2 (a).
Double twisting: Forty raw yarns of 1500-d aramid (1000 filaments) were doubled and twisted into a first twist yarn. Three 1500d/40 first twist yarns were gathered together and subjected to final twisting, thereby preparing reinforcing cord 4A shown in FIG. 2 (c).
Eight strand structure: Three raw yarns of 1500-d aramid (1000 filaments) were doubled and twisted into a first twist yarn. Five 1500d/3 first twist yarns were gathered together and subjected to final twisting to form a strand. Eight 1500d/3/5 strands were used to form an eight strand structure.
Braid structure (core braid): Four raw yarns of 1500-d aramid (1000 filaments were doubled and twisted into a first twist yarn. Fourteen 1500d/4 first twist yarns were gathered together and subjected to final twisting to prepare a core. Sixteen twist yarns formed by doubling and twisting 4 raw yarns of 1500-d aramid (1000 filaments) were braided on the outside of the core of skin (or sheath).

Further conveyor belts of the present invention (Examples 19 to 22) and comparative conveyor belts (Comparative Examples 9 and 10) were prepared in the same manner as described above in connection with the preparation of the conveyor belt of the above present invention, with the organic fiber, the size of the conveyor belt, and the reinforcing cord structure kept the same as those above, except that, the denier of the core yarn was varied to vary the proportion (%) of the denier of the core yarn to the total denier of the reinforcing cord as specified in Table 7.

These conveyor belts were tested for durability in the same manner as described above, and the strength retention was determined.

TABLE 7

|  | Comparative Example 9 | Example 19 | Example 20 | Example 21 | Example 22 | Comparative Example 10 |
|---|---|---|---|---|---|---|
| Proportion of core (%) | 0 | 2.3 | 4.8 | 9.5 | 14.2 | 16.7 |
| Cord diameter (mm) | 5.2 | 5.3 | 5.4 | 5.5 | 5.6 | 5.7 |
| Strength retention (%) | 82 | 87 | 90 | 91 | 86 | 81 |

TABLE 8

|  | Ex. 23 | Ex. 24 | Ex. 25 | Ex. 26 |
|---|---|---|---|---|
| Final twist multiplier K | 400 | 600 | 1400 | 1600 |
| Tensile strength before test (kgf) | 3400 | 3350 | 3100 | 2750 |
| Strength retention (%) | 85 | 88 | 92 | 85 |

Further, conveyor belts of the present invention (Examples 23 to 26) were prepared in the same manner as described above in connection with the preparation of the conveyor belt of the present invention (Example 18), with the organic fiber and the size of the conveyor belt kept the same as those in Example 18, except that, the final twist multiplier K was varied. The retention (%) of the tenacity before the belt durability test relative to the tenacity after the belt durability test was determined as described above. The results are give in Table 8.

Further, test conveyor belts (Test Ex. 1 to 7) were prepared in the same manner as described above in connection with the preparation of the conveyor belt of the present invention as given in Table 6, except that the orientation angle θ of the fiber filaments in the core yarn to be inserted into the core of the reinforcing cord to the orientation direction of the fiber filaments constituting the strand was varied as specified in Table 9.

The durability of these test conveyor belts were tested and evaluated as described above. The results are given in Table 9.

TABLE 9

|  | Test Example 1 | Test Example 2 | Test Example 3 | Test Example 4 | Test Example 5 | Test Example 6 | Test Example 7 |
|---|---|---|---|---|---|---|---|
| Orientation angle (°) | 25 | 18 | 9 | 0 | −9 | −18 | −25 |
| Strength retention (%) | 85 | 87 | 91 | 90 | 90 | 88 | 85 |

Note)
Reinforce cord structure: The core yarn was polyester 1500d/4, and the proportion of the denier of the core yarn to the total denier of the reinforcing cord was 4.8%, the reinforcing cord had a structure of 1500d/4/10/3, and the final twist multiplier K was 1000. The orientation angle of the fiber filaments in the core yarn to the direction of the fiber filaments constituting the strand was regulated by varying the number of twists in the core yarn. In Table 9, when the orientation angle is a plosive value, the filaments in the core yarn were inclined in one direction at that angle to the filaments constituting the strand, while when the orientation angle is a negative value, the filaments in the core yarn is inclined in the opposite direction at that angle to the filaments constituting the strand.

Further, conveyor belts of the present invention (Examples 27 and 29) were prepared in the same manner as described above in connection with the preparation of the conveyor belt of the present invention (Example 18) as given in Table 6, with the structure of the reinforcing cord kept the same as in Example 16, except that, the strand was treated with an adhesive containing a rubber latex to form a coating of the adhesive on the surface of the strand and the coated strands were then twisted into a reinforcing cord. Separately, a conveyor belt (Example 28) was prepared in the same manner as describe just above, except that the adhesive further contained fine particles of molybdenum disulfide.

Specifically, four 1500-d raw yarns (1000 filaments) of aramid were doubled and twisted into a first twist yarn. Ten 1500d/4 first twist yarns (yarn 3a) were gathered together and subjected to secondary twisting into a strand. This strand was treated with an adhesive solution of a vinylpyridine/ styrene/ butadiene terpolymer rubber latex (Nipol 2518FS, manufactured by Nippon Zeon Co., Ltd.), an epoxy resin (DENACOL EX313, manufactured by Nagase Chemicals Ltd.) and a blocked isocyanate (ELASTRON BN69, manufactured by Dai-Ichi Kogyo Seiyaku Co., Ltd.) dissolved in a ratio of 3:1:1 on a solid basis in water, dried, and heat-treated. Thereafter, three treated strands were placed on a 1500d/4 core yarn polyester fiber and twisted as described above to prepare a reinforcing cord.

Similarly, the above strand was treated with an adhesive dispersion of a vinylpyridine/styrene/ butadiene terpolymer rubber latex (Nipol 2518PS, manufactured by Nippon Zeon Co., Ltd.), an epoxy resin (DENACOL EX313, manufactured by Nagase Chemicals Ltd.), a blocked isocyanate (ELASTRON BN69, manufactured by Dai-Ichi Kogyo Seiyaku Co., Ltd.), and fine particles of molybdenum disulfide having an average particle diameter of 1.0 μm in a ratio of 3:1:1:1 (20 parts of molybdenum disulfide based on 100 parts of the adhesive) on a solid basis in water, dried, and heat-treated. Thereafter, three treated strands were placed on a 1500d/4 core yarn polyester fiber and twisted as described above to prepare a reinforcing cord.

Separately, a strand treated in the same manner as described just above, except that the solution for treating the strand was an aqueous solution of an epoxy resin, not containing a rubber latex, and a blocked isocyanate in a ratio of 1:1 on a solid basis. Thereafter, three treated strands were placed on a 1500d/4 core yarn polyester fiber and twisted as described above to prepare a reinforcing cord.

These three reinforcing cords were then immersed in a mixed solution of an initial condensation product, between resorcin and formaldehyde, and a rubber latex, dried, and heat-treated to improve the adhesion between the reinforcing cord and the rubber.

These reinforcing cords were embedded in a rubber to prepare conveyor belts, and the durability of the conveyor belts were measured as described above. The results are given in Table 10.

TABLE 10

|  | Ex. 27 | Ex. 28 | Ex. 29 |
|---|---|---|---|
| Rubber latex coating | Done | Done | Not done |
| Addition of molybdenum disulfide | Not done | Done | Not done |
| Strength retention (%) | 93 | 96 | 89 |

As is apparent from Tables 1 to 5, the conveyor belts of the present invention having such a structure that a reinforcing cord embedded in a belt body has a triple twist structure using first twisting, secondary twisting, and final twisting, respectively effected by twisting a plurality of organic fiber filament bundles having a tenacity of not less than 15 g/d into a yarn (a first twist yarn), twisting a plurality of the first twist yarns into a strand, and twisting a plurality of the strands, a core yarn having a denier 1 to 15% of the total denier of the reinforcing cords being inserted into the core of the twist structure of the cord, the core yarn comprising a bundled organic fiber filament yarn having a larger elongation than that constituting the reinforcing cord, can provide higher tenacity and better durability than the comparative conveyor belts using reinforcing cords having a structure different from that of the reinforcing cords according to the present invention.

Further, it is apparent that the orientation angle of the organic fiber filaments constituting the core yarn inserted in the twist center of the reinforcing cord according to the present invention is preferably within ±20° to the orientation direction of the organic fiber filaments constituting the reinforcing cored from the viewpoint of durability of the conveyor belt. Furthermore, it is apparent that the final twist multiplier K of the reinforcing cord according to the present invention is still preferably 500 to 1500 from the viewpoints of durability and tenacity of the conveyor belt.

Furthermore, it is apparent that, from the viewpoint of durability of the conveyor belt, at least one of the organic fiber filament bundle, the yarn formed by twisting a plurality of the organic fiber filament bundles, and the strand formed by twisting a plurality of the yarns is still preferably one which has been coated with an adhesive layer, containing a rubber latex, prior to twisting into the reinforcing cord. Furthermore, it is apparent that the incorporation of fine solid particles of graphite into the adhesive layer results in further improved durability of the belt conveyor.

As is apparent from Tables 6 to 10, the conveyor belts of the present invention having such a structure that a reinforcing cord embedded in a belt body has a triple twist structure using first twisting, secondary twisting, and final twisting, respectively effected by twisting a plurality of organic fiber filament bundles having a tenacity of not less than 15 g/d into a yarn (a first twist yarn), twisting a plurality of the first twist yarns into a strand, and twisting a plurality of the strands, the filaments in the organic fiber filament bundle being oriented at an angle within ±10° to the cord axis of the reinforcing cord, can provide higher tenacity and better durability than the comparative conveyor belts using reinforcing cords having a structure different from that of the reinforcing cords according to the present invention.

Further, it is apparent that the final twist multiplier K of the reinforcing cord according to the present invention is still preferably 500 to 1500 from the viewpoints of durability and tenacity of the conveyor belt. Furthermore, it is apparent that the insertion of a core yarn, having a denier 1 to 15% of the total denier of the reinforcing core, into the core of the reinforcing cord according to the present invention is preferred from the viewpoint of durability of the conveyor belt.

Furthermore, it is apparent that, from the viewpoint of durability of the conveyor belt, at least one of the organic fiber filament bundle, the yarn formed by twisting a plurality of the organic fiber filament bundles, and the strand formed by twisting a plurality of the yarns is still preferably one which has been coated with an adhesive layer, containing a rubber latex, prior to twisting into the reinforcing cord. Furthermore, it is apparent that the incorporation of fine solid particles of molybdenum disulfide into the adhesive layer results in further improved durability of the belt conveyor.

As is apparent from the foregoing description, the conveyor belt according to the present invention having such a structure that a reinforcing cord constituting a reinforcing layer embedded in an endless belt body along the longitudinal direction of the belt body has a tenacity of not less than 10 g/d and a diameter of 2 to 15 mm and comprises twisted bundles of organic fiber filaments having a tenacity of not less than 15 g/d, the reinforcing cord having a triple twist structure using first twisting, secondary twisting, and final twisting, respectively effected by twisting a plurality of organic fiber filament bundles to form a first twist yarn, twisting a plurality of the first twist yarns to form a strand, and twisting a plurality of the strands, the filaments in the organic fiber filament bundle being oriented at an angle within ±10° to the cord axis of the reinforcing cord, is lightweight, highly tensile, and free from rusting and troublesome disposal problem and has prolonged service life by virtue of enhanced fatigue resistance.

Further, as is apparent from other Examples of the present invention, the conveyor belts of the present invention having such a structure that a reinforcing cord constituting a reinforcing layer embedded in a belt body along the longitudinal direction of the belt body has a tenacity of not less than 10 g/d and a diameter of 2 to 15 mm and comprises twisted bundles of organic fiber filaments having a tenacity of not less than 15 g/d, the reinforcing cord having a triple twist structure using first twisting, secondary twisting, and final twisting, respectively effected by twisting a plurality of organic fiber filament bundles having a tenacity of not less than 15 g/d into a first twist yarn, twisting a plurality of the first twist yarns into a strand, and twisting a plurality of the strands, a core yarn having a denier 1 to 15% of the total denier of the reinforcing cords being inserted into the core of the twist structure of the cord, the core yarn comprising a bundled organic fiber filament yarn having a larger elongation than that constituting the reinforcing cord, is lightweight, highly tensile, and free from rusting and troublesome disposal problem and has prolonged service life by virtue of enhanced fatigue resistance.

What is claimed is:

1. A conveyor belt comprising an endless belt body and a plurality of reinforcing cords embedded in the endless belt body along the longitudinal direction of the belt body and in substantially parallel alignment at predetermined intervals in the widthwise direction of the belt body, the reinforcing cords each having a tenacity of not less than 10 g/d and a diameter of 2 to 15 mm and comprising twisted bundles of organic fiber filaments having a tenacity of not less than 15 g/d, the reinforcing cord has a triple twist structure using first twisting, secondary twisting, and final twisting, respectively effected by twisting a plurality of organic fiber filament bundles into a first twist yarn, twisting a plurality of the first twist yarns into a strand, and twisting a plurality of the strands, the filaments in the organic fiber filament bundle being oriented at an angle of ±10° to the cord axis of the reinforcing cord.

2. The conveyor belt according to claim 1, which further comprises a core yarn, having a denier 1 to 15% of the total denier of the reinforcing cords, inserted into the core of the twist structure of the reinforcing cord, the core yarn comprising a bundled organic fiber filament yarn having a larger elongation than said organic fiber filament bundle constituting the reinforcing cord.

3. A conveyor belt comprising an endless belt body and a plurality of reinforcing cords embedded in the endless belt body along the longitudinal direction of the belt body and in substantially parallel alignment at predetermined intervals in the widthwise direction of the belt body, the reinforcing cords each having a tenacity of not less than 10 g/d and a diameter of 2 to 15 mm and comprising twisted bundles of organic filaments having a tenacity of not less than 15 g/d, the reinforcing cord has a triple twist structure using first twisting, secondary twisting, and final twisting, respectively effected by twisting a plurality of organic fiber filament bundles into a first twist yarn, twisting a plurality of the first twist yarns into a strand, and twisting a plurality of the strands, a core yarn having a denier 1 to 15% of the total denier of the reinforcing cords being inserted into the core of the twist structure of the reinforcing cord, the core yarn comprising a bundled organic fiber filament having a larger elongation than said organic fiber filament bundle constituting the reinforcing cord.

4. The conveyor belt according to claim 2 or 3, wherein the core yarn comprises a group of organic fiber filament bundles gathered together and the filaments in the organic fiber filament bundle are oriented at an angle within ±20° to the direction in which the organic fiber filaments constituting the reinforcing cord are oriented.

5. The conveyor belt according to any one of claims 2 to 3, wherein the organic fiber filament constituting the core yarn comprises a nylon fiber filament and/or a polyester fiber filament.

6. The conveyor belt according to any one of claims 1 to 3, wherein the reinforcing cord has a final twist multiplier of 500 to 1500, the final twist multiplier K being defined as $K = T \cdot D^{1/2}$ wherein T represents the number of final twists ((twists/10 cm) and D represents the total denier of the reinforcing cord excluding the core yarn.

7. The conveyor belt according to any one of claims 1 to 3, wherein the reinforcing cord has a three strand twist structure formed by twisting three strands.

8. The conveyor belt according to any one of claims 1 to 3, wherein at least one of the organic fiber filament bundle constituting the reinforcing cord, the first twist yarn formed by twisting a plurality of the organic fiber filament bundles, and the strand formed by twisting a plurality of the first twist yarns is coated with an adhesive, containing a rubber latex, prior to twisting into the reinforcing cord.

9. The conveyor belt according to claim 8, wherein the adhesive containing a rubber latex contains fine particles of graphite, fine particles of molybdenum disulfide, or a mixture of the fine particles of graphite with the fine particles of molybdenum disulfide.

* * * * *